July 27, 1926.  L. T. DURHAM  1,593,798
REMOVABLE HUB LINER
Filed August 21, 1925
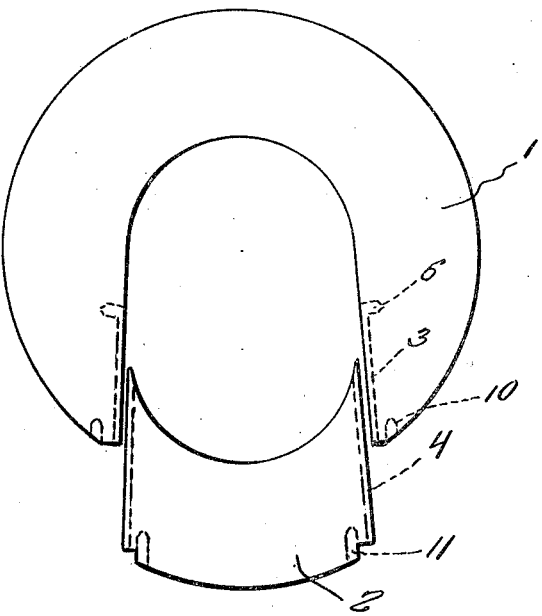
Fig. 1.
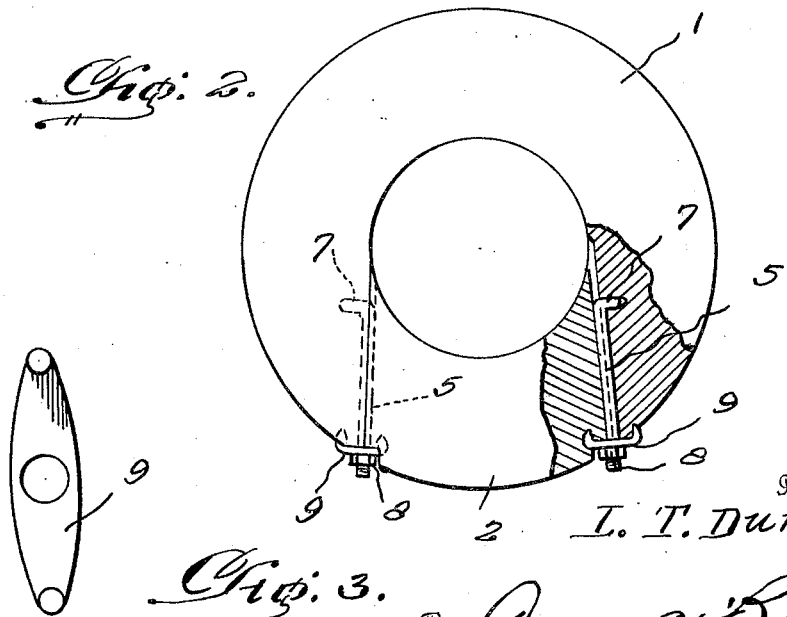
Fig. 2.
Fig. 3.
Inventor
L. T. Durham,
By Clarence A. O'Brien
Attorney Patented July 27, 1926.

1,593,798

UNITED STATES PATENT OFFICE.

LEROY T. DURHAM, OF RATON, NEW MEXICO.

REMOVABLE HUB LINER.

Application filed August 21, 1925. Serial No. 51,603.

This invention relates to an engine truck and driving wheel hub liner, and its object is to provide a sectional ring, the sections of which, when assembled on a journal, will be so engaged as to prevent, so far as possible, injurious angular movement of the segments or sections with respect to each other, and at the same time, so interengaged that any relative slipping of the sections on each other which may occur in use, will take place on slight curved surfaces.

A further object is to provide a two-part hub liner embodying the above features, and being so constructed that it can be readily assembled on a journal with the sections or segments locked against displacement from each other.

Other features and advantages of the invention will become apparent from the following description and drawing.

In the accompanying drawing forming a part of this application, and in which like numerals are employed to designate like parts throughout the same:

Figure 1 is a view, in elevation, showing a hub liner constructed in accordance with the present invention with the removable segment detached.

Figure 2 is a view like Figure 1 with portions broken away and shown in sections, and with the two segments or sections connected together.

Figure 3 is an enlarged view of one of the clamps.

Referring to the drawings, the reference character 1 designates one segment or section, and the reference character 2 designates the complemental segment. The first named segment occupies about three quarters of the diameter of the device, and the other section occupies the remaining part. The abutting ends of the two sections are formed with semi-circular grooves 3 and 4 respectively, which when brought together provide circular bores for reception of removable connecting pins or bolts 5. Formed at the inner end of the groove 3 is an angular socket 6 in which the angularly directed inner end 7 of the bolt 5 extends. The outer end of the bolt is screw threaded and extends beyond the periphery of the body and a nut 8 is threaded thereon. This nut serves to hold a removable clamping member 9 in place. The clamping member has its opposite ends directed angularly and fitted into sockets or recesses 10 and 11 which are formed in the adjacent ends of the two segments 1 and 2.

From the foregoing description it will be seen that I have evolved and produced a novel metal hub liner, which is a decided improvement upon those now commonly used. The construction is exceedingly simple, and such that it affords easy installation, promotes economy, requires little attention, and is exceedingly efficient in service. The outstanding feature, is, of course, to provide a construction which may be readily applied and removed without removing the wheels from the engine. These and other advantages and features of the invention have doubtless been made apparent from the foregoing description and drawings. Moreover it is believed that the invention is now clear, and a more lengthy description is therefore unnecessary.

While the preferred embodiment of the invention has been shown and described, it is to be understood that minor changes coming within the field of invention claimed may be resorted to if desired.

Having thus described the invention, what I claim is:—

1. A hub liner of the class described comprising a body including a pair of segments having their opposite ends arranged in abutting relation, said abutting ends being provided with complemental grooves forming bores, a bolt fitted into each bore and connected at its inner end to one of the segments, the outer end extending beyond the periphery of the body and being screw threaded, a nut on said bolt, and a clamp surrounding the bolt and held by said nut against the adjacent ends of the two segments.

2. A hub liner of the class described comprising a body composed of a pair of segments having their opposite ends arranged in abutting relation, said abutting ends being provided with complemental grooves forming a pair of bolt receiving bores, bolts fitted into said bores, the bores being slotted at their inner ends with rectangularly disposed sockets and the inner end portions of the bolts being directed at right angles and extending into said sockets, the outer ends of the bolts extending beyond the periphery of the body and being screw threaded, a removable clamping plate surrounding the threaded end of each bolt, the opposite ends of said plate being provided with rectangular extensions and said body being formed with recesses into which said extensions are fitted, and nuts on the threaded extended ends of the bolts serving to hold such clamps in place.

In testimony whereof I affix my signature.

LEROY T. DURHAM.